United States Patent [19]
Yarber

[11] 3,770,328
[45] Nov. 6, 1973

[54] BRAKE CONTROL SYSTEM WITH FLOW CONTROL

[76] Inventor: Gordon W. Yarber, deceased, late of Malibu, Calif., by Anna Mildred Yarber, Administratrix, 6070 Ramirez Canyon Rd., Malibu, Calif. 90265

[22] Filed: May 12, 1972

[21] Appl. No.: 252,716

Related U.S. Application Data

[62] Division of Ser. No. 27,736, April 13, 1970, Pat. No. 3,704,047.

[52] U.S. Cl. .................. 303/21 F, 303/10, 303/54, 251/121, 251/205
[51] Int. Cl. .......................... B60t 15/04, B60t 8/02
[58] Field of Search ............... 303/10, 21 F, 40, 303/52–54; 251/120, 121, 205; 137/625.26

[56] References Cited
UNITED STATES PATENTS

| | | | |
|---|---|---|---|
| 3,519,311 | 7/1970 | Holden | 303/21 F |
| 1,144,758 | 6/1915 | Desmond | 303/54 UX |
| 3,423,136 | 1/1969 | Lohbauer | 303/54 |
| 3,485,474 | 12/1969 | Baumann | 251/121 |
| 3,515,441 | 6/1970 | Stein | 303/54 |
| 3,610,701 | 10/1971 | Riordan | 303/21 F |
| 3,610,702 | 10/1971 | MacDuff | 303/10 |
| 3,661,427 | 5/1972 | Hodge | 303/21 F |

Primary Examiner—Robert S. Ward, Jr.
Attorney—Charlton M. Lewis

[57] ABSTRACT

The invention provides more gradual and typically more linear response to an abrupt change of command force in a pressure regulating valve for brake control. The described structure is particularly useful in an anti-skid brake control system. A flow limiting orifice is inserted between the control valve and the output, and the hydrostatic force for balancing the applied command force is developed in part directly from the pressure at the output and in part from the pressure in the space between the control valve and the orifice. The effective size of the flow limiting orifice is preferably variable directly with the degree of opening of the control valve.

11 Claims, 3 Drawing Figures

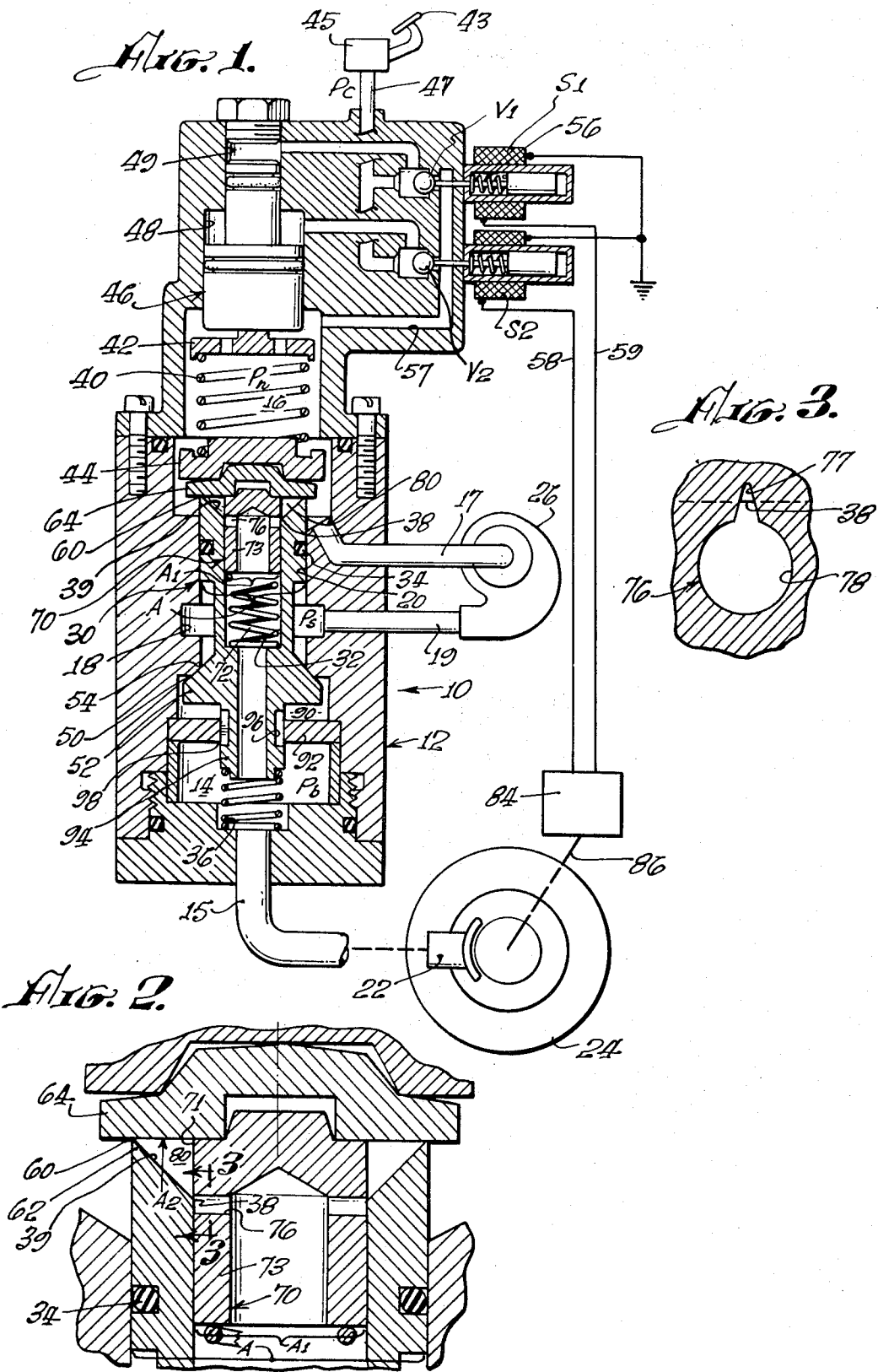

BRAKE CONTROL SYSTEM WITH FLOW CONTROL

This application is a division of patent application Ser. No. 27,736, filed Apr. 13, 1970, now U.S. Pat. No. 3,704,047, under the title "Pressure Regulating Valve With Flow Control."

This invention has to do with pressure regulating valves of the type in which a valve member is movable with respect to a valve seat to maintain an output fluid pressure in equilibrium with a variable control force.

The invention is particularly useful in connection with hydraulic brake control systems which employ such pressure regulating valves for developing a commanded brake pressure, or for modulating a pressure that has been commanded. Such modulation may be employed, for example, to reduce the effective brake pressure in response to an incipient skid condition of a braked wheel to prevent actual skidding of the wheel.

The invention provides remarkably simple and economical mechanism for regulating the rate of liquid flow to or from a pressure regulating valve of the described type for controlling the output pressure. One form of the invention provides a generally constant degree of flow limitation. Another form of the invention provides a degree of flow limitation that varies sharply with the position of the valve control member.

In particular, the permitted flow rate may be caused to decrease as the valve member approaches closed position. A large portion of the pressure drop across the valve is thereby transferred from the control valve itself to the flow limiting structure, tending to smooth the action and to control any tendency of the valve to oscillate or chatter as equilibrium condition is approached. This aspect of the invention is particularly useful in connection with pressure regulating valves in which the controlled pressure can be both increased and decreased by respective valve orifices that are controlled by opposite movements of a common control member.

An important aspect of the present invention provides means for limiting the initial rate of pressure change in response to a sudden change of command force, thereby making the overall time course of pressure adjustment more nearly linear.

Such linearization of the pressure change is particularly beneficial in anti-skid brake control systems. Such systems typically include a skid sensing device for producing a skid signal in response to an incipient skid condition. Such a skid signal may change its value very rapidly, and it is desirable for the pressure regulating valve to respond promptly to such signal changes. On the other hand, an incipient skid condition is sometimes corrected by a smaller reduction of brake pressure than was initially called for. By substituting a controlled rate of pressure reduction for the conventional, substantially instantaneous dumping of brake pressure in response to a sudden skid signal, the invention permits the skid sensor to respond in those cases in which the skid is being corrected, and to countermand the skid signal before it has been fully complied with. A corresponding situation applies to abrupt increases in brake pressure called for by the anti-skid system.

The prior art includes many descriptions of brake control systems in which the present invention is useful. Illustrative of such descriptions is my U.S. Pat. No. 3,006,696, issued on Oct. 31, 1961.

A full understanding of the invention, and of its further objects and advantages, will be had from the following description of certain illustrative manners in which it may be carried out. The particulars of that description, and of the accompanying drawings which form a part of it, are intended only as illustration and not as a limitation upon the scope of the invention which is defined in the appended claims.

In the drawings:

FIG. 1 is an axial section representing an illustrative pressure regulating valve embodying the invention as typically employed in a skid control system;

FIG. 2 is a fragmentary section corresponding to a portion of FIG. 1 at enlarged scale; and FIG. 3 is a fragmentary section at enlarged scale on the line 3—3 of FIG. 2.

The illustrative pressure modulating valve shown somewhat schematically at 10 in FIG. 1 comprises the housing 12 enclosing the axially alined output chamber 14 and return chamber 16, connected by the axial bore 20. A peripheral channel intermediate the length of the bore forms the supply chamber 18. That chamber is connected via the conduit 19 to the pump 26, which supplies a suitable hydraulic liquid at an elevated supply pressure $P_s$. Return chamber 16 is connected via the conduit 17 to the suction or return inlet of pump 26, which maintains a relatively low return pressure $P_r$. The controlled output pressure $P_b$ in output chamber 14 is supplied via the conduit 15 to any desired utilization device, represented as the hydraulically actuated brake 22 for the wheel 24. The poppet member 30 is slidably mounted in bore 20 and is itself provided with an axial through bore 32. The O-ring 34 prevents leakage from supply chamber 18 upward around the poppet member. Such terms as upper and lower in the present description refer to the valve as it appears in FIG. 1, though that orientation is not necessary.

Liquid flow downward from supply chamber 18 to output chamber 14 to increase the output pressure is controlled by the inlet valve orifice 50, formed between the housing flange 54 and the peripheral flange 52 near the lower end of the poppet member. Flow from outlet chamber 14 via poppet bore 32 to return chamber 16 to lower the outlet pressure is controlled by the outlet valve orifice 60, formed between the upper and radially outer edge 62 of the poppet member and the plate 64 which serves as valve seat (FIG. 2). Each of the circular valve orifices 50 and 60 encloses essentially the same area, which will be referred to as the valve area. The poppet member is urged upward by the light spring 36, which is typically just strong enough to support the weight of the poppet member and keep valve orifice 50 closed when other forces are in equilibrium. For convenience, valve orifices 50 and 60 will generally be referred to simply as the inlet and outlet valves, respectively.

Inlet valve 50 and outlet valve 60 are jointly controlled in action by a variable control force that is applied downward on valve plate 64. That control force may be developed in any desired manner, for example by a manually driven mechanical plunger, an electrically energized solenoid, or a hydraulic actuator. The control force is typically applied to valve plate 64 via a yielding mechanism, shown as the control spring 40 with spring seats 42 and 44, which reduces the dependence of the effective force upon movement of the valve plate.

In the present illustrative structure, the control force is developed by the dual piston 46 from a control pressure $P_c$, which is supplied from a suitable source 45 via the conduit 47. Control pressure $P_c$ is supplied to one or both of the two piston chambers 48 and 49 under selective control of the pilot valves V1 and V2. Those valves are normally held by the springs 56 in the positions shown in FIG. 1, admitting control pressure $P_c$ to both piston chambers 48 and 49. Upon energization of the solenoids S1 and S2, the valve elements are shifted to the left as seen in FIG. 1, cutting off the respective piston chambers from $P_c$ and supplying them instead with return pressure $P_r$, typically obtained from return chamber 16 via the passage 57.

Energizing currents for the solenoids are supplied via the lines 58 and 59 and are developed by skid sensing and control apparatus shown schematically at 84, which receives information on the rotation of wheel 24 via the connection indicated at 86. Sensing and control apparatus 84, which may be of any desired type, develops skid signals for either one or both of the valves V1 and V2 in response to incipient skid conditions of different degrees of severity, preferably on a binary digital basis. The utilization of digital signals for that purpose and apparatus for doing so are described and claimed in my copending patent application Ser. No. 792,344, filed Jan. 21, 1969, now U.S. Pat. No. 3,545,817. The pressure regulating valve 10 produces an output pressure $P_b$ that has a normal value, in absence of a skid signal, equal to the control pressure $P_c$ multiplied by a definite factor, which may be considered the gain of valve 10. That factor is equal to the total piston area of piston chambers 48 and 49 divided by the valve area, defined above. The gain is typically unity, but may be either greater or less than unity. In presence of a skid signal on one or both of the lines 58 and 59, output pressure $P_b$ is reduced to a definite fraction of its normal value, or to return pressure $P_r$.

The structure of pressure modulating valve 10 as so far described is generally illustrative of the wide variety of conventional pressure regulating valves, and is also illustrative of the frequent use of such valves in skid control systems. Typical flow limiting structure in accordance with the present invention will now be described.

The piston element 70 is mounted in poppet bore 32, in which it is freely slidable. The piston is yieldably urged upward by the light spring 72 into continuous contact with valve plate 64, causing the piston to move axially with that plate. The contact formations between the piston and plate are preferably designed to permit at least slight angular movement to accommodate any inaccuracies of structure. The piston might alternatively be rigidly secured to plate 64, or even formed integrally with it, making spring 72 unnecessary.

The poppet bore 32 in which the piston slides terminates at its upper end in a definite edge 38, produced by intersection of the cylindrical bore wall with the outwardly flared conical wall surface 39 (FIG. 2). The cylindrical wall 71 of the piston projects above edge 38, defining with conical surface 39 and valve plate 64 the generally annular flow control chamber 80. That chamber communicates with the piston interior via orifice structure 76 in the skirt portion 73 of the piston, typically comprising a plurality of radial apertures. Apertures 76 are so positioned axially that in closed position of outlet valve 60 their outer ends are partially covered by the edge 38. The effective orifice is thereby reduced to a definite minimum size. As outlet valve 60 opens, piston 70 moves upward with valve plate 64, uncovering apertures 76 progressively with the valve movement.

Apertures 76 typically comprise conventional drilled holes of selected diameter. If that diameter is made less than the maximum travel of valve 60, all the holes are sometimes fully exposed. The effective orifice size then has a set maximum value, determined jointly by the diameter and number of the holes. The minimum effective orifice size when valve 60 is closed can be determined within a wide range by suitable axial positioning of the holes, which need not be uniform. The functional relationship between the effective orifice size and the travel of valve 60 is ordinarily not critical, but may be varied if desired within wide limits by providing holes of various selected sizes and positions, or by forming the apertures with irregular cross sections of special design.

FIG. 3 represents an illustrative aperture section, with triangular upper portion 77 and generally circular lower portion 78. The cylinder edge 38 is shown in typical position for closed condition of valve 60, exposing only a small upper section of the triangular aperture portion 77. As valve 60 opens, causing edge 38 to move downward relative to the aperture, the effective orifice size increases at first at a linearly increasing rate until edge 38 reaches the circular orifice portion 78. The orifice then increases at a much larger rate, corresponding generally to the diameter of portion 78. That diameter may be made large enough to provide relatively free flow, which may even be virtually unimpeded, if desired, once valve 60 is well open, while the relatively small aperture portion 77 provides severely limited and accurately controllable flow when valve 60 is nearly closed. A similar functional relation may be obtained, for example, by forming one or more apertures as relatively thin axial slots and others as drilled holes. Alternatively, all apertures in the piston wall may be so placed that they are fully covered when valve 60 is closed, the desired degree of communication with chamber 80 under that condition being provided in some other manner, as by designed leakage between the periphery of piston 70 and the surrounding bore wall of poppet 30.

Operation of the described flow control structure is as follows. When outlet valve 60 is closed, as under equilibrium conditions, the balance of control forces is the same as if piston 70 were not present. The upward force on valve plate 64 corresponds to output pressue $P_b$ acting directly on the area $A_1$ of piston 70 and also acting via orifice 76 and chamber 80 on the annular area $A_2$ of valve plate 64 that surrounds piston 70 (FIG. 2). The force upward on valve plate 64 is therefore $P_bA$, where A is the entire circular area $A_1+A_2$ within valve 60.

When valve 60 opens, for example in response to an abrupt decrease in the control force exerted by spring 40, the resulting flow brings piston 70 and its orifice 76 into operation. The pressure difference between output pressure $P_b$ and return pressure $P_r$ is then no longer applied entirely across valve 60, but is divided between valve 60 and orifice 76. The ratio of that division varies with the ratio of the respective flow capacities of the valve and orifice, which varies as a predetermined function of the degree of opening of valve 60. The pressure in chamber 80 is thereby reduced from $P_b$ to a definite value $P_x$ intermediate $P_b$ and the return pressure $P_r$ in chamber 16. The upward hydrostatic force on plate 64 available to balance spring 40 is therefore reduced from $P_bA$ to $P_bA_1 + P_xA_2$. The force unbalance which initially caused valve 60 to open is thereby partially corrected even before $P_b$ has significantly decreased. That reduction of unbalance reduces the tendency for valve 60 to open wide and produce rapid initial dumping of $P_b$. Instead, fluid is released at a rate that is moderated by the flow limiting action of orifice 76.

The flow reduction just described is due only in part to direct resistance at orifice 76. Of equal or greater importance is the reduction in opening of valve 60 that results from the lowered pressure in chamber 80. The latter flow regulating action can be made relatively dominant or relatively slight according as $A_2$ is large or small compared to $A_1$. If $A_1$ and $A_2$ are equal within a factor of two or three, say, the time course of the adjustment of output pressure $P_b$ to an abrupt decrease in command force tends to be relatively linear in form, in contrast to the rapid initial decrease and rather asymptotic approach to final value that occur with conventional pressure regulating valves. At the same time, as the final equilibrium is attained, the fact that orifice 76 takes an appreciable portion of the total pressure drop tends to prevent instability at valve 60 as it finally closes. To insure such stabilizing action orifice 76 is preferably designed so that, as the valve approaches the critical condition at which chattering is most likely to occur, a major portion of the pressure drop occurs at orifice 76.

Especially if stability control is not required, many of the advantages of the invention can be obtained with a piston orifice of constant effective size, as by positioning all the apertures so they are above the edge 38 in all positions of valve 60.

FIG. 1 further illustrates structure for applying flow regulation in accordance with the invention to inlet valve 50 at the lower end of poppet element 30, which valve controls flow of pressurized fluid from supply chamber 18 to outlet chamber 14 to increase the outlet pressure $P_b$. The annular plate 92 is mounted below valve 50 in fixed relation to housing 10 and with its internal periphery in telescopically sliding relation to the cylindrical poppet extension 94. Plate 92 thus defines the auxiliary flow control chamber 90 between valve 50 and output chamber 14. Orifice structure 96 between chambers 14 and 90 is so constructed that the effective orifice 98 is small when valve 50 is closed, and increases in size progressively with opening of that valve by virtue of the downward movement of poppet 30 relative to plate 92. Such structure is shown illustratively as a plurality of axial channels 96 in the periphery of poppet extension 94 in such axial position that they extend below plate 92 only slightly in closed position of valve 50 and extend above plate 92 far enough to provide an ample orifice in all positions of the poppet. The effective orifice size is then determined essentially by the lower ends of the channels.

Operation of orifice 98 in controlling the intermediate pressure $P_y$ in chamber 90 is essentially similar to the operation already described by which orifice 76 controls pressure $P_x$ in chamber 80. With valve 50 closed, output pressure $P_b$ in chamber 14 exerts an upward force directly on the circular area $B_1$ of poppet extension 94 and indirectly via orifice 98 and chamber 90 on the annular area $B_2$ having as inner radius that of the poppet extension and as outer radius the effective radius of valve 50. When valve 50 opens, typically in response to an abrupt increase in the control force applied by spring 40, the pressure drop across orifice 98 raises the pressure in chamber 90 to a value $P_y$ intermediate $P_b$ and the much higher supply pressure $P_s$. The upward force on the poppet is thereby increased from $P_b(B_1+B_2)$ to $P_bB_1+P_yB_2$, tending to close valve 50. The rate of flow through valve 50 is thus moderated by flow regulating action of orifice 98. That action is subject to control by design of the structure in accordance with the same principles already explained in connection with orifice 76 and valve 60.

In a bi-directional pressure regulating valve, such as that of FIG. 1, flow control of the described type may be provided in connection with either the inlet or the outlet valve or with both, according to the requirements of a particular installation. It has been found, however, that suitably designed flow control for only one of the valves is ordinarily sufficient to provide valve stability during both directions of pressure control. Apparently the tendency of a conventional pressure regulating valve to chatter results from oscillations which involve cyclic alternate opening of both inlet and outlet valves, so that damping of the flow at either valve is capable of stopping the oscillation.

In combination with a brake skid control system, as shown illustratively in FIG. 1, the flow regulating property of the described structure has the advantage of modulating the rate at which the brake pressure $P_b$ accommodates to an abrupt change of command force. The degree of that modulation is readily controllable by selection of the effective size of orifice 76 for controlling decrease of brake pressure, and of orifice 98 for controlling increase of brake pressure. It is usually desirable to provide only relatively slight modulation of the flow rate. In response to a skid signal, for example, which shifts one or both of the valves VI and V2 in a direction to reduce the downward command force developed by piston 46 and transmitted via spring 40 to valve plate 64, it is desirable for the brake pressure to respond promptly to prevent full development of a skid. On the other hand, effective skid control does not ordinarily require instantaneous dumping of the brake pressure to zero. The present flow modulation does not delay the initiation of brake relief, but causes the brake pressure to decrease at a controlled rate. The difference in action is especially significant during the initial portion of the adjustment to an abrupt change of command force. By curbing the usual very rapid initial response, the overall pressure adjustment is made more nearly linear with time.

The degree of flow modulation is typically selected with regard to the time constants of the overal system to permit the system to respond effectively in those cases in which the incipient skid is controlled almost immediately.

A skid signal is occasionally produced as a result of some momentary or even spurious condition which is corrected without significant decrease of brake pressure. Under that condition, it is highly desirable to moderate the system response to the skid signal sufficiently to permit effective cancellation of the signal without excessive unnecessary loss of brake pressure. Accordingly, degree of flow modulation is preferably selected with regard to the effective time constants of the system so that full adjustment of brake pressure to a skid signal requires a time longer than is needed to countermand the signal after the wheel recovers from its incipient skid conditions.

The following comments are made with particular reference to claim terminology. Whereas in the preceding description chambers 16 and 18 have been referred to for clarity as the return and supply chambers, respectively, it is noted that both chambers can properly be designated as supply chambers. Just as chamber 18 supplies the relatively high pressure $P_s$ provided by the pump outlet, chamber 16 supplies the relatively low pressure $P_r$ provided by the pump inlet. Moreover, when considering the action of valve 60 the poppet 30 may be regarded as fixed with respect to the housing. Similarly, when considering the action of valve 50 the poppet may be regarded as fixed with respect to the lower seat 44 of control spring 40. The axial sliding movement of poppet extension 94 relative to plate 92 during operation of valve 50 is analagous to the movement of piston 70 relative to poppet 30 during operation of valve 60, and it is therefore convenient to consider extension 94 as a piston structure moving in the cylindrical wall provided by plate 92. The flow control chambers 80 and 90 are both formed between their respective valves 60 and 50 and the output chamber, and include wall portions of annular form through which a force derived from fluid pressure is applied to member 64 either directly or via poppet member 30.

I claim:

1. In a skid control system for a braked wheel, the combination of
   command mechanism actuable to develop a brake control force,
   skid control means for modifying the control force in response to an incipient skid condition of the wheel,
   an output line for receiving fluid at a variable output pressure,
   means for actuating the brake in response to pressures in the output line within a brake actuating range,
   pressure regulating mechanism responsive jointly to the control force and to the output pressure and including an inlet valve and an outlet valve, said mechanism opening the valves selectively to supply fluid to or from the output line to maintain a predetermined equilibrium relation between the output pressure and the control force,
   and flow control means acting in response to flow through one of the valves to oppose said opening of that valve by said pressure regulating mechanism.

2. The combination defined in claim 1, and in which said control means comprise structure forming an orifice of limited size interposed between the output line and said one valve for developing a pressure difference across the orifice in response to flow through that one valve,
   and said pressure regulating valve mechanism includes wall portions that are exposed to fluid pressures on opposite sides of the orifice and that develop jointly a hydrostatic balancing force opposing the control force, whereby flow through said one valve causes the balancing force to vary in a direction tending to close the valve.

3. The combination defined in claim 2, and in which said orifice forming structure includes formations coupled to said one valve for relative movement in response to valve operation, said formations defining a minimum effective orifice size when the valve is closed, and increasing the effective orifice size in response to opening movement of the valve.

4. In a brake control system for a wheel brake, which system includes command mechanism for developing a control force representing a desired brake pressure, a source of supply pressure and a source of return pressure, pressure regulating valve mechanism including an output chamber and means responsive to the control force for connecting the output chamber selectively to the pressure sources to normally maintain a predetermined relationship between the pressure in the output chamber and the control force, and means for actuating the brake in response to the pressure in the output chamber; the improvement characterized by the fact that said valve mechanism comprises
   a valve between the output chamber and one of said pressure sources,
   structure forming an orifice of limited effective size between the output chamber and the valve,
   means responsive jointly to fluid pressures on both sides of the orifice for developing a balancing force that opposes and normally balances the control force,
   and means for operating the valve under joint control of the control force and the balancing force.

5. The improvement defined in claim 4, and in which said brake control system includes
   skid control means for modifying said control force in response to an incipient skid condition of the wheel.

6. The improvement defined in claim 5, and in which said means for developing the balancing force includes
   movable wall portions that are exposed to pressures on the respective sides of the orifice,
   and means for summing the hydrostatic forces exerted on the wall portions to derive said balancing force.

7. The improvement defined in claim 5, and in which said orifice forming structure includes formations which jointly define the size of said orifice and which are coupled to said valve for relative movement to vary the orifice size in response to valve operation.

8. The improvement defined in claim 7, and in which the direction of said relative formation movement is such that the orifice size increases in response to opening of the valve.

9. The improvement defined in claim 4, and in which said orifice forming structure comprises
   coaxial piston and cylinder structures that are relatively movable in response to operation of the valve,
   and transverse surfaces on the piston and cylinder structures defining between them said orifice,
   whereby the effective size of the orifice is variable in response to valve operation.

10. The improvement defined in claim 4, and in which
   said valve comprises a circular poppet valve formed between one end of a poppet member and a valve seat carried by a movable control member, the poppet member having a coaxial bore communicating with the outlet chamber and having a diameter smaller than the valve diameter, and said orifice forming structure comprises a sleeve piston slidable in the bore in response to movement of the control member relative to the poppet member, the piston head projecting from the bore toward the control member, with an aperture in the sleeve that is partially covered by the bore wall when the valve is closed, movement of the control member away from the poppet member to open the valve causing the aperture to be progressively less covered by the bore wall.

11. The improvement defined in claim 4, and in which said valve comprises a poppet member slidable in a housing bore that communicates at one end with said outlet chamber, the poppet member including an end portion projecting from said end of the bore and carrying an external flange that cooperates with a circular valve seat at the end of the bore to form the valve, said orifice forming structure comprising a coaxially apertured housing wall between the valve and the outlet chamber, a coaxial stem on the poppet member extending through the wall aperture, and cooperating formations on the stem and on the wall forming a passageway through the wall that has a limited effective size when the valve is closed and opens progressively as the poppet member moves toward the wall.

* * * * *